United States Patent
Valeri et al.

(10) Patent No.: US 9,928,027 B1
(45) Date of Patent: Mar. 27, 2018

(54) SYSTEMS AND METHODS FOR DYNAMIC ENGINE SOUND ENHANCEMENT

(71) Applicant: GM GLOBAL TECHNOLOGY OPERATIONS LLC, Detriot, MI (US)

(72) Inventors: Frank C. Valeri, Novi, MI (US); Scott M. Reilly, Southfield, MI (US); Roger C. Barlow, Jr., Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/427,999

(22) Filed: Feb. 8, 2017

(51) Int. Cl.
| | |
|---|---|
| *H04B 1/00* | (2006.01) |
| *G06F 3/16* | (2006.01) |
| *B60Q 5/00* | (2006.01) |
| *H04R 3/12* | (2006.01) |

(52) U.S. Cl.
CPC ............ *G06F 3/165* (2013.01); *B60Q 5/008* (2013.01); *H04R 3/12* (2013.01); *H04R 2499/13* (2013.01)

(58) Field of Classification Search
USPC ........ 381/71.4, 71.9, 73.1, 71.11, 71.1, 71.8, 381/86, 389
See application file for complete search history.

(56) References Cited

U.S. PATENT DOCUMENTS

| 9,227,566 B2* | 1/2016 | Valeri | B60Q 5/005 |
| 9,347,388 B2* | 5/2016 | Bohn | F02N 11/0814 |
| 2002/0136415 A1* | 9/2002 | Daly | G10K 11/1788 |
| | | | 381/71.4 |

* cited by examiner

*Primary Examiner* — Yosef K Laekemariam
(74) *Attorney, Agent, or Firm* — Lorenz & Kopf, LLP

(57) ABSTRACT

Methods and systems are provided for dynamic sound enhancement for a mobile platform. The system comprises a memory for storing a plurality of unique sound profiles, and a processor communicatively coupled to the memory. The processor receives an identification (ID) for the mobile platform, a driving mode, and references the memory using the ID and driving mode to select a sound profile. The processor also receives sail status data and engine status data for the engine, which indicates whether the engine is in sail mode or not, and the progression of the mobile platform within sail mode. Responsive to the sail status and engine status data, and in accordance with the selected sound profile, the processor generates commands for an audio system coupled to the mobile platform.

12 Claims, 2 Drawing Sheets

SYSTEMS AND METHODS FOR DYNAMIC ENGINE SOUND ENHANCEMENT

TECHNICAL FIELD

The technical field generally relates to sound management systems, and more particularly relates to systems and related operating methods for mobile platform engine sound enhancement.

BACKGROUND

People are generally familiar with the sounds emitted from components of a powertrain associated with a combustion engine of a mobile platform, such as a vehicle. First, drivers often rely on this aural feedback to reinforce assumptions about vehicle speed and performance. In addition, onlookers, such as pedestrians, often rely on the aural feedback to make assumptions about vehicle proximity. However, as vehicles increasingly rely on electric propulsion, they have become quieter, which may be undesirable for the drivers and the onlookers. In particular, hybrid vehicles may be undesirably quiet while coasting. In a hybrid vehicle, coasting is generally referred to as engine sail mode, or simply, "sail." Sail is generally defined as a condition of the combustion engine switched off and disconnected from the powertrain of the vehicle, generally also having a duration of time in which this condition occurs. During engine sail, the lack of familiar "engine" sounds can be disconcerting.

Accordingly, an engine sound enhancement system and method capable of dynamically responding to engine sail by providing expected aural feedback associated with a powertrain of a vehicle is desirable. The desired system and method provides powertrain sounds that are consistent with expected sounds across varying vehicle speeds and models. Furthermore, other desirable features and characteristics of the present disclosure will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A system for a mobile platform is provided. The system comprises: a memory comprising a plurality of sound profiles; and a processor communicatively coupled to the memory, the processor configured to: receive an identification (ID) for the mobile platform; receive a driving mode; reference the memory using the ID and driving mode to select a sound profile; receive sail status data and engine status data for the engine; and generate, responsive to processing the sail status data, the engine status data, and the selected sound profile, commands for an audio system coupled to the mobile platform.

Also provided is computer implemented method for a mobile platform. The method comprises: receiving, by a processor, a driving mode; selecting a unique sound profile from a memory based on processing the driving mode with an identification (ID) for the mobile platform, wherein the unique sound profile comprises sounds for (i) sail, and at least one of (ii) entering sail and (iii) stop; receiving sail status data for the engine; and generating, based on the sail status data and the unique sound profile, commands for an audio system that is mechanically coupled to the mobile platform.

Another system for a mobile platform is provided. The system comprises: an audio device configured to be mechanically coupled to the mobile platform; a memory comprising a plurality of sound profiles, each sound profile of the plurality of sound profiles comprising prerecorded sounds and rules to generate sounds; and a processor communicatively coupled to the audio device and the memory, the processor configured to: receive a driving mode and an ID for the mobile platform; reference the memory using the driving mode and ID to select a sound profile for the id; receive engine status data and sail status data for the engine; and generate, responsive to processing the engine status data, the sail status data and the selected sound profile, commands for the audio device.

BRIEF DESCRIPTION OF THE DRAWINGS

The present application will hereinafter be described in conjunction with the following drawing figures, wherein like numerals denote like elements, and.

DETAILED DESCRIPTION

Figure 1:
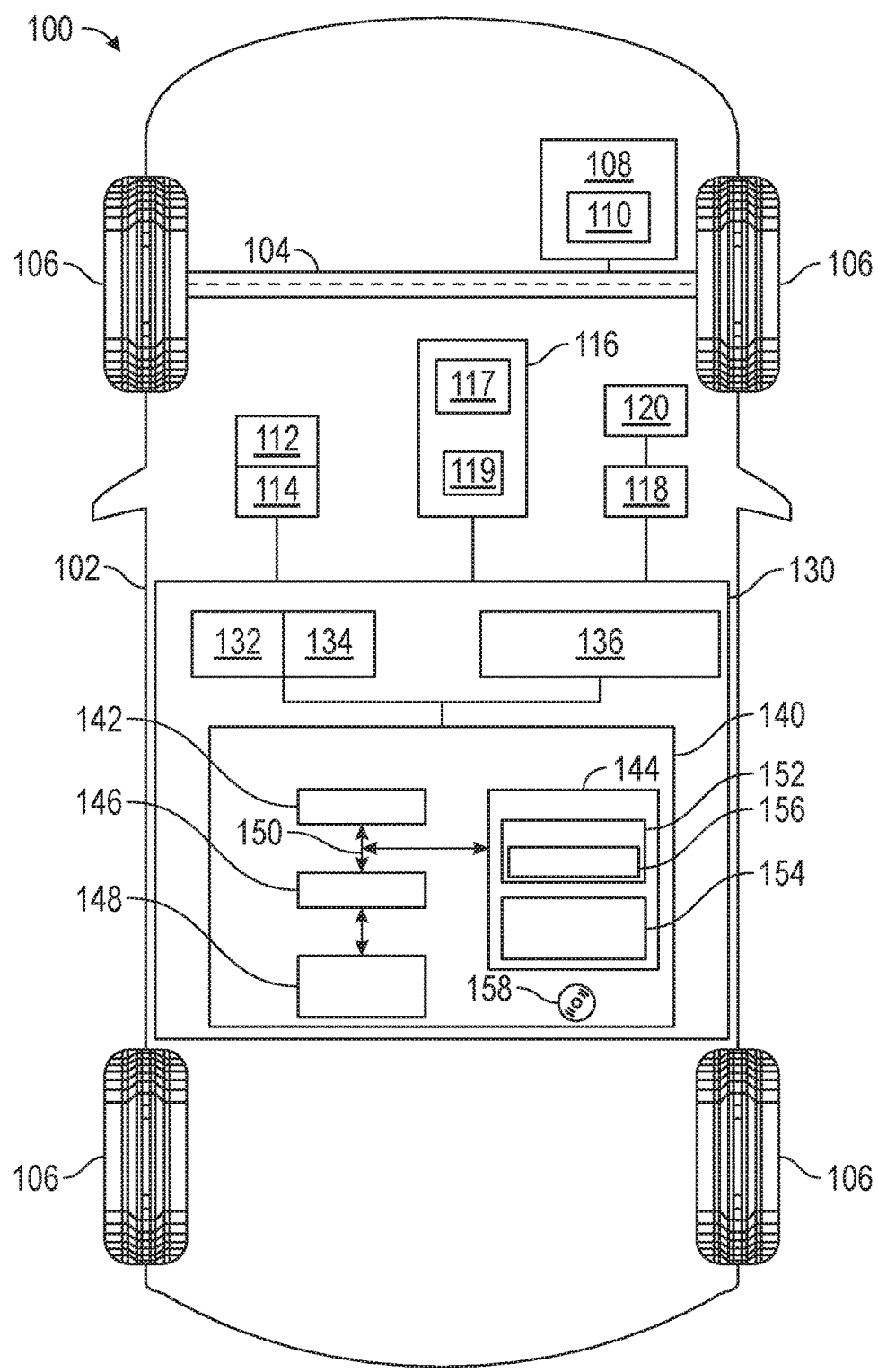
FIG. 1 is a functional block diagram illustrating a destination based energy management system, in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration." Any implementation described herein as exemplary is not necessarily to be construed as preferred or advantageous over any other implementations.

It should be appreciated that the various block components techniques and technologies described herein and with reference to symbolic representations of operations, processing tasks, and functions that may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Such operations, tasks, and functions are sometimes referred to as being computer-executed, computerized, software-implemented, or computer-implemented.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As an overview, the provided sound enhancement system is configured to command an audio system to emit expected sounds during engine sail. In doing so, the provided sound enhancement system references, during sail, a sound profile that selected to match an engine type and a user selected driving mode for a mobile platform. The selected sound profile is one of a plurality of stored sound profiles that each provide a combination of previously stored sounds and rules for generating sounds based on the engine status during sail. The provided sound enhancement system dynamically generates commands for the audio system responsive to the engine sail status and the engine status.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided dynamic sound enhancement system and method may take the form of a control module integrated within a preexisting mobile platform management system or vehicle management system.

Turning now to FIG. 1, a functional block diagram of a vehicle 100 is depicted, in accordance with an exemplary embodiment. Although the depicted embodiment realizes the mobile platform as a vehicle 100, the concepts presented here can be deployed in other mobile platforms, such as aircraft, spacecraft, watercraft, motorcycles, robots, robotic devices, and the like. Moreover, the concepts presented here may also be deployed in non-mobile platform applications, if so desired.

The vehicle 100 includes a body 102 that is arranged on a chassis 104. The body 102 substantially encloses the systems and components of the vehicle 100. The body 102 and the chassis 104 may jointly form a frame. The vehicle 100 also includes a plurality of wheels 106. The wheels 106 are each rotationally coupled to the chassis 104 near a respective corner of the body 102 to facilitate movement of the vehicle 100. In the depicted embodiment, the vehicle 100 includes at least one fixed object (such as a steering wheel or a seat) that is mechanically coupled to the chassis 104, and four wheels 106, although these may vary in other embodiments (for example for trucks and certain other vehicles).

Referring again to FIG. 1, non-limiting examples of the systems and components that may be enclosed within the body 102 of the vehicle 100 include: a powertrain 108, a user input device 112, a display device 114, an audio system 116, a tactile system 118, and a control system 130. These functional blocks are described in more detail below.

The powertrain 108 is a propulsion system mounted on the chassis 104, and comprises a drive train for driving the wheels 106. In certain exemplary embodiments, the powertrain 108 comprises an internal combustion engine and/or an electric motor/generator (referred to herein as simply an "engine" 110), coupled with a drive train and a transmission thereof. In certain embodiments, the powertrain 108 may vary, and/or two or more powertrains 108 may be used. By way of example, the engine 110 may include any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor. The engine 110 may further be associated with a manual or automatic transmission. Many of the herein described "expected sounds" are related to spinning parts, such as the rotations per minute (RPM) of a crank shaft in the powertrain 108. A tachometer signal, provided by the powertrain 108, provides a measure of the RPM of the crank shaft, and is processed by the control module 140 in the generation of sound. In terms of identifying a sound profile, a vehicle identification (ID), described in more detail below, includes information about the engine 110 and powertrain 108.

The user input device 112 may be any one, or combination, of various known user input device devices including, but not limited to, a touch sensitive screen, a cursor control device (CCD) (not shown), such as a mouse, a trackball, or joystick, and/or a keyboard, one or more buttons, switches, or knobs. In various embodiments, the user may utilize the user input device 112 to select from among predetermined driver selectable driving modes, such as, tour, sport, race, and track, as described above.

The audio system 116 may comprise one or more subsystems sufficient to detect sounds and/or speech, as well as multiple audio devices that generate sounds and/or speech. In practice, as one non limiting example, an audio device 117 may be located within a cabin area of the vehicle 100, and an audio device 119 may be located outside of the cabin area of the vehicle 100, such as, on or near the powertrain 108. The audio system 116 can be responsive to user input and/or the control system 130. Responsive to commands from the processor 142, the audio system 116 emits sounds from a selected sound profile, and ceases emission of sounds from the selected sound profile. The sounds emitted reflect the vehicle's sail status (i.e., where in the process of sailing or coasting the vehicle is) and they may include (i) prerecorded sounds, and (ii) generated sounds. In various embodiments, the sounds emitted may include, for example, pops and burbles attributed to spinning parts within the powertrain 108. In various embodiments, the commands from the processor 142 may include (i) commands for a first audio device 117 of the audio system 116, the first audio device 117 being located internal to a cabin of the mobile platform (for example, as part of an infotainment system), or (ii) commands for a second audio device 119 of the audio system 116, the second audio device 119 for example, being located external to the cabin of the vehicle 100.

The display device 114 may be implemented using any one of numerous known display devices suitable for rendering textual, graphic, and/or iconic information in a format viewable by a user. As such, the display device 114 may be part of or integrated with an infotainment or navigation system 132. Non-limiting examples of such display devices include cathode ray tube (CRT) displays, and flat panel displays such as LCD (liquid crystal displays) and TFT (thin film transistor) displays. In various embodiments, the display device 114 may display the predetermined driver selectable driving modes, ID information, and the like.

The tactile system 118 may comprise one or more tactile transducers, each tactile transducer being mechanically coupled to the mobile platform, generally by being mechanically coupled to a fixed object 120 (such as a steering wheel, seat, or gearbox) within the vehicle 100 or to the frame (body 102 and chassis 104). As may be appreciated, tactile sensations may comprise a blending of frequencies that a person can feel but not hear. Just as a user expects, for a given powertrain 108, sounds to vary with respect to the sail status and the engine status, a user also expects the vibrations generated by the tactile system 118 to be consistent with the sail status and engine status. The transducers within the tactile system 118 generate vibrations that are tactilely perceptible to a person within or near the vehicle 100, for example, by vibrating the objects (120, 102, 104) they are mechanically coupled to. The tactile system 118 generates tactile feedback and ceases generation of tactile feedback responsive to commands from a control module 140 within the control system 130. Accordingly, each sub-sound profile within a sound profile may comprise unique rules for how the processor 142 may command the tactile system 118.

In the embodiment depicted in FIG. 1, the control system 130 includes a navigation system 132, a sensor system 134, a transceiver 136, and a control module 140, each described below. The control system 130 is in operable communication with, and may provide centralized control for, at least the user input device 112, the display device 114, the audio system 116, the tactile system 118, and the powertrain 108.

The navigation system 132 includes sensors, devices, instruments (such as radar, Lidar, and a global positioning system (GPS)), and software, sufficient for detecting and providing vehicle position, location, and orientation. In various embodiments, the navigation system 132 may be integrated with the display device 114 and audio system 116.

The sensor system 134 of the vehicle 100 generally includes a plurality of sensors, devices, and software, sufficient for sensing information, converting the sensed information into digital information, and providing the digital information, generally, as vehicle status data, and in particular, as engine status data, to the control system 130. Generally, each sensor of the plurality of sensors is specifically coupled to a component or subsystem of the vehicle 100 and configured to sense a specific aspect of the component or subsystem. In various embodiments, aspects of components and subsystems that are sensed include: electrical, pressure, and/or mechanical connection of the components and subsystems, temperature, vibration, and velocity. As a non-limiting example, the sensed information from the sensor system 134 that is provided as engine status data to the control module (140 within the control system 130), and includes tactile information, velocity and acceleration information, wheel rotation, breaking gravitational (G) force, inclines and declines during travel, pressure on a gas pedal and a brake, gear status, external temperature, battery status information, sensed sail status, and sensed cabin temperature.

The transceiver 136 may include at least one receiver and at least one transmitter that are operatively coupled to the processor 142. The transceiver 136 can enable the control module 140 to establish and maintain the communications links to onboard components and external communication sources, including wireless communication. The transceiver 136 can perform signal processing (e.g., digitizing, data encoding, modulation, etc.) as is known in the art. In some embodiments, the transceiver 136 is integrated with the control module 140.

The control system 130 performs a variety of vehicle control functions. With respect to functions of the control module 140, the control system 130 receives inputs from any combination of (i) the user input device 112, (ii) the audio system 116, (iii) the powertrain 108, and (iv) the sensor system 134. The control system 130 processes the inputs, and performs tasks to command the audio system 116 and the tactile system 118, as appropriate, based thereon.

Figure 2:
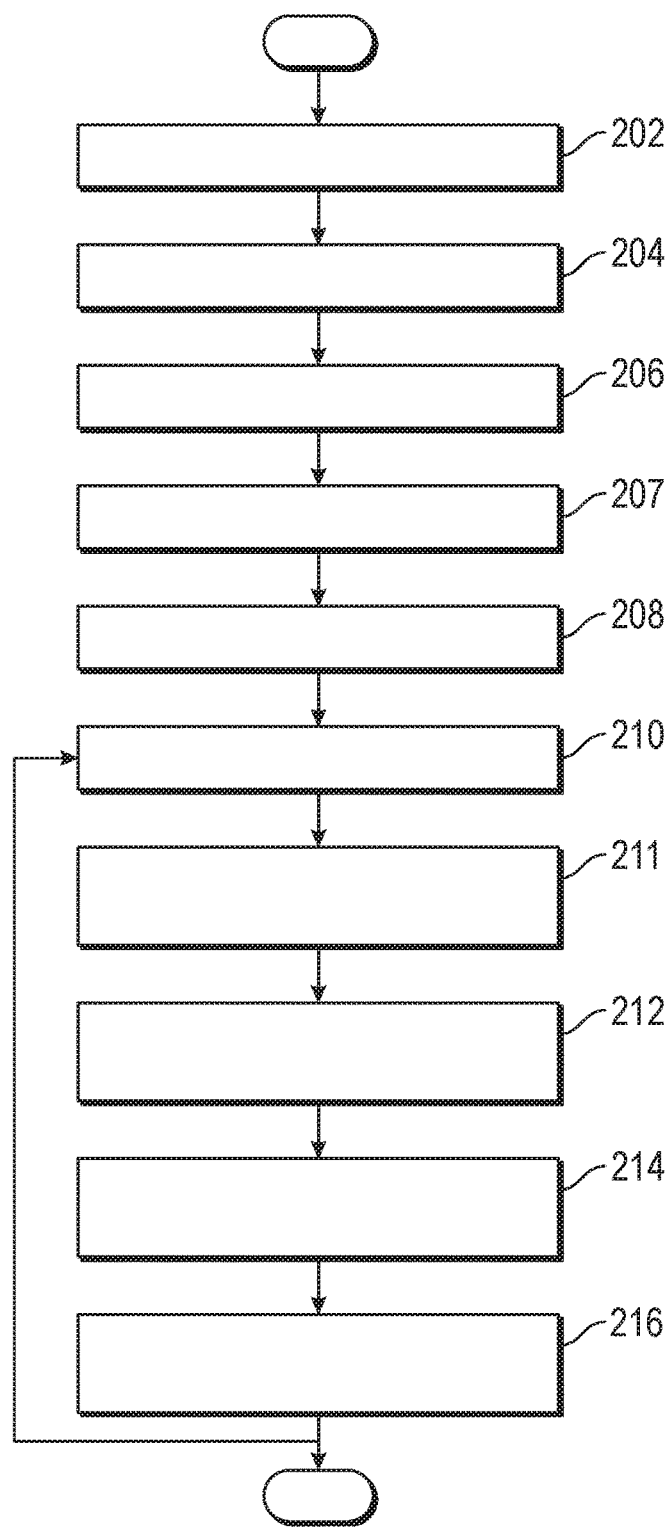
FIG. 2 is a flow chart describing a method for destination based energy management, in accordance with various exemplary embodiments.

With continued reference to FIG. 1, the components of the control module 140 and their functions are described. In the depicted embodiment, the computer system of the control module 140 includes a processor 142 communicatively coupled to a memory 144, an interface 146, a storage device 148, a bus 150, and an optional storage disk 158. In various embodiments, the control system 130 (and more specifically, the control module 140) performs these actions and other functions in accordance with steps of the method 200 described further below in connection with FIG. 2. The processor 142 performs the computation and control functions attributed to the control module 140, and may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

During operation, the processor 142 loads and executes one or more programs, algorithms and rules embodied as instructions and applications 152 contained within the memory 144 and, as such, controls the general operation of the control system 130 as well as the computer system of the control module 140. In executing the processes described herein, such as the method 200 of FIG. 2, the processor 142 loads and executes at least program 156.

A computer readable storage medium, such as a memory 144, a storage device 148, or a disk 158 may be utilized as both storage and a scratch pad. The memory locations where data bits are maintained are physical locations that have particular electrical, magnetic, optical, or organic properties corresponding to the data bits. The memory 144 can be any type of suitable computer readable storage medium. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced instructions and applications 152 along with one or more configurable variables in stored values 154.

The storage device 148 is a computer readable storage medium in the form of any suitable type of storage apparatus, including direct access storage devices such as hard disk drives, flash systems, floppy disk drives and optical disk drives. In one exemplary embodiment, the storage device 148 comprises a program product from which memory 144 can receive a program 156 that executes one or more embodiments of one or more processes of the present disclosure, such as the steps of the method 200 (and any sub-processes thereof). In another exemplary embodiment, the program product may be directly stored in and/or otherwise accessed by the memory 144 and/or a disk (e.g., disk 158), such as that referenced below.

The plurality of unique sound profiles and their sub-sound profiles, and related sound generation rules and tactile rules, may also be stored in the computer readable storage medium, such as the memory 144, the storage device 148, or the disk 158. Configurable variables may also be stored in memory 144, for example, at stored values 154. Configurable variables include a predetermined sail speed for which sail is defined as traveling at a speed less than. In an embodiment, the predetermined sail speed is five miles per hour, but in various other embodiments, the sail speed may be over 60 miles per hour. The determination that the vehicle 100 is stopping may be based on a configurable predetermined variable, such as a stop speed, in conjunction with input from the powertrain 108 and/or one or more sensed inputs included in the engine status data. The tachometer signal, provided by the powertrain 108 (measuring RPM of the crank shaft), is an input utilized in determining (i) sail status as well as the (ii) sub-sound profile of a sound profile that is relevant at any given time. In an embodiment, predetermined stop speed is 1 mile per hour. The predetermined stop speed is another variable that may be stored in stored values 154.

The bus 150 serves to transmit programs, data, status and other information or signals between the various components of the computer system of the control module 140. The bus 150 can be any suitable physical or logical means of connecting computer systems and components. This includes, but is not limited to, direct hard-wired connections, fiber optics, infrared and wireless bus technologies. During operation, the program 156, stored in the memory 144, is loaded and executed by the processor 142.

The interface 146 enables communication within control module 140, for example from a system driver and/or another computer system, and can be implemented using any suitable method and apparatus. In one embodiment, the interface 146 obtains the various data from the navigation system 132, the sensors of the sensor system 134 and/or the transceiver 136. The interface 146 can include one or more network interfaces to communicate with other systems or components. The interface 146 may also include one or more network interfaces to communicate with technicians, and/or one or more storage interfaces to connect to storage apparatuses, such as the storage device 148.

Having described the components within the vehicle 100, a detailed discussion of engine "sail status" and "sound profiles" is provided. As mentioned, sail is defined herein as a period of time during which a powertrain 108 of the vehicle 100 is switched off a combustion engine 110 which decouples the combustion engine 110 from the drive train (not shown); the period of time referred to as sail may further be conditioned upon the vehicle 100 traveling at less than a configurable predetermined sail speed. In addition, sail may be conditioned upon the further condition that the vehicle speed is decreasing and/or decreasing at a predetermined rate. In an embodiment, the predetermined coast or sail speed is five miles per hour, but in various other embodiments, the application specific coast or sail speed may be over 60 miles per hour. Accordingly, "sail status data" for an engine 110 comprises any combination of inputs from the powertrain 108 and the sensor system 134 that communicates, at a minimum, whether the engine 110 is in "sail" (i.e., coasting) or not. Regardless of the specific conditions used by an embodiment for defining sail, when the conditions for defining sail are met, the vehicle is determined to be in sail mode. Sail status, therefore, may be described as at least a "sail flag" that is asserted when the vehicle 100 is in sail, and deasserted when the vehicle 100 is no longer in sail. The predetermined sail speed, predetermined deceleration, and any predetermined duration(s) of time utilized in determining engine sail status are variables that may be stored in stored values 154.

In addition to the sail flag, sail status may include an indicator that sail is about to be entered. IN various embodiments, an "entering sail flag" may be asserted a predetermined amount of time before sail is entered. The entering sail flag is generally deasserted substantially when the sail flag is asserted. In various embodiments, the entering sail flag which may be determined and generated by the control module 140, an input from the powertrain 108 or an input from the sensor system 134.

Generally, when the vehicle 100 either stops or begins to accelerate it is no longer considered to be coasting or sailing (in sail mode). The determination that the vehicle 100 is currently stopping sail or has already stopped sail may be based on sensed engine 110 status data and/or a powertrain 108 input, such as the tachometer signal. As with the entering sail flag, a "stop" flag that indicates the end of sail may be determined and generated by the control module 140, an input from the powertrain 108 or an input from the sensor system 134. In various embodiments, sail status data may further communicate whether sail has stopped/ended with the stop flag; sail stop, or the stop flag, may represent that the engine 110 has reconnected to the drive train or that the engine 110 has stopped (i.e., the engine 110 is no longer driving a powertrain to move the vehicle 100). The determination that the vehicle is stopping may employ a configurable predetermined variable, such as a stop speed. The stop flag may be deasserted once a stop is complete, or in accordance with the requirements of a specific application.

In summary, as used herein, sail status data communicates at least whether a vehicle is in sail or not, and may comprise one or more signals of the set including an entering sail flag, and a stop flag. The flags are signals that each has two possible states: asserted and de-asserted. It may be appreciated that the boundaries between entering sail, sail, and stopping sail are application specific and configurable.

Having provided a discussion of sail status, the sound profiles and how they are related to the sail status is now described. Generally, a sound profile may include a variety of expected sounds organized to align with the sail status described above. In other words, a sound profile provides expected sounds for entering sail, sail, and stopping sail. Expected sounds in a sound profile generally include sounds of gear engagements and transitions, and the sounds of spinning parts related to a crank shaft within the powertrain 108, as mentioned above. Since different engines 110 generally emit different sounds, the different engines 110 (i.e., a six cylinder or an eight cylinder, a manual transmission, or an automatic transmission) may be expected to have correspondingly different sound profiles. Further, a sound profile may be a combination of sounds that a user expects to hear when an all-combustion engine (i.e., a non-electric engine) is coasting. Likewise, the entering sail and stopping sail sounds may also be a combination of sounds that a user expects to hear when an all-combustion engine (i.e., a non-electric engine) is starting to coast or stopping coasting. In particular, stopping sail may include "coast down" or "idle" sounds. Additionally, expected sounds across the entire sound profile may include cabin sounds uniquely associated with an interior of the frame or cabin space within a given vehicle 100. Further still, the sound profile may differ based upon features of an audio system 116, such as, where one or more audio devices 117, 119 are located within or on the vehicle 100. In each case, the sound profile may be associated with at least an engine type.

Accordingly, sound profiles are unique and may be organized and stored using a mobile platform identification, or vehicle identification (ID), which is a tag that distinguishes one mobile platform from another based on any combination of distinguishing features, such as engine type, transmission type, cabin type, mobile platform model, and the like. In an embodiment, the sound profiles are organized in a lookup table in which each sound profile is matched to an ID. In these embodiments, each sub-sound profile comprises (i) prerecorded sounds and may further include (ii) rules for the processor to generate commands to command the audio system 116 to generate sounds. The pre-recorded and generated sounds of each sound profile are further conditioned upon dynamically received engine status data, which enables a complete, dynamic sound profile that is dynamically responsive to engine status and perceived by a driver as very realistic. As mentioned, an exemplary expected sound is that of the RPMs of the crankshaft within the powertrain 108. In various embodiments, rules defining the generation of expected tones or sounds may comprise generation of an artificial RPM signal (i.e., a pseudo tachometer). These tones or sounds are blended together in a way that results in a complete sound profile that imitates the sound of the powertrain 108 in the vehicle 100. The pseudo tachometer is necessary in sail because in sail the engine 110 is turned off, and/or disconnected from the wheels 106 and therefore not rotating the wheels 106.

Summarizing a sound profile so far, the sound profile for each ID comprises three sub-sound profiles: entering sail, sail, and stopping sail. Referencing Table 1, below, a sound profile is depicted with three columns under sound profile, and four IDs are shown (1-1, 1-2, 2-1, and 3-2). In the example provided by Table 1, a first ID represents a first model type with a first engine 110 and a second ID represents a second model type with the first engine 110. For example, the first engine can be an eight cylinder engine, the second engine can be a six cylinder engine, the first model can be a sports car, and the second model can be a sports utility vehicle. Following this example, rows 1-4 are a sports car with an eight cylinder engine, and rows 5-9 are a sports utility vehicle with an eight cylinder engine. The same applies in reverse: one model type for a vehicle may be available with two or more different engines 110; in other words, rows 1-4 may be the sports car with the eight cylinder engine and rows 9-12 may be the sports car with a six cylinder engine. In the example, a third ID represents a third model type with a second engine 110, and a fourth ID represents a third model type with a third engine 110. In this example, the four IDs are unique, and a unique sound profile is associated with each of the four unique IDs. The letters a-j represent the sub-sound profiles introduced above, the sub-sound profiles combine in a variety of ways to create a complete sound profile for an ID. Redundant letters are used in Table 1 to show that, in some cases, sub-sound profiles may apply to more than one ID. As mentioned above, in various embodiments, the mobile platform may be something other than a vehicle, for which the contents of Table 1 would vary accordingly. Summarizing the above, each sound profile of the plurality of sound profiles comprises an ID matched with a sound profile, wherein the sound profile includes sub-sound profiles comprising sounds for (i) sail, and at least one of (ii) entering sail and (iii) stop.

As mentioned above, each sub-sound profile is a combination of (a) prerecorded sounds and (b) rules for processing engine status inputs from sensor system 134 and/or powertrain 108 input and commanding an audio system 116 to generate sounds based thereon. In embodiments that command the tactile system 118, the sub-sound profiles each further include rules for commanding the tactile system 118 responsive to engine status inputs. Accordingly, in various embodiments, each sub-sound profile (letters a-j and the variations below) may comprise any blended combination of (i) prerecorded sounds for playback through the audio system 116, (ii) rules for the processor 142 to command the audio system 116 to generate sounds, such as that of a pseudo tachometer, and (iii) rules for the processor 142 to command the tactile system 118 to generate vibrations.

TABLE 1

| | ID | | | Sound Profile | | |
| --- | --- | --- | --- | --- | --- | --- |
| number | engine type | vehicle model | driving mode | entering sail | sail | stopping sail |
| 1 | 1 | 1 | tour | a | b | c |
| 2 | | | sport | as | bs | cs |
| 3 | | | stealth | ast | bst | cst |
| 4 | | | track | at | bt | ct |
| 5 | 1 | 2 | tour | a | d | c |
| 6 | | | sport | as | ds | cs |
| 7 | | | stealth | ast | dst | cst |
| 8 | | | track | at | dt | ct |
| 9 | 2 | 1 | tour | e | f | g |
| 10 | | | sport | es | fs | gs |
| 11 | | | stealth | est | fst | gst |
| 12 | | | track | et | ft | gt |
| 13 | 3 | 2 | tour | h | f | j |
| 14 | | | sport | hs | fs | js |
| 15 | | | stealth | hst | fst | jst |
| 16 | | | track | ht | ft | jt |

A driver may wish to further customize the driving sound experience to different levels of aggression in driving style and/or to different driving scenarios. Non-limiting examples of supported driving modes include that of a sound of the vehicle at a racetrack, the sound of a sport edition of the vehicle, or the like. A driver may customize the driving sound experience for a given ID by selecting, via user input device 112, among predetermined driving modes. On the left of Table 1, each ID is further distinguished by predetermined driver selectable driving modes including, tour, sport, stealth, and track. Any of the supported predetermined driver selectable driving modes may be configured as a default driving mode, with the associated sound profile as a default sound profile. Table 1 depicts a driving mode called "tour" as the default driving mode, with the associated "tour" sound profile for each ID shown in rows 1, 5, 9, and 13.

As is readily appreciated, the selected driving mode affects the expected sounds for each sub-sound profile within a sound profile. For example, depending upon the selected driving mode, as the vehicle goes into "idle or coast down" (sail mode starts and progresses toward stopping the vehicle), the user may expect to hear a walk-down of gears, or, alternately, a smooth transition of gears. Such variations are mainly due to sounds produced by valved exhaust systems or turbo wastegates. Accordingly, in various embodiments, the sound profile associated with each ID in Table 1 may be further modified by available predetermined driver selectable modes, for example, as shown in the sound profiles indicated in rows 2, 3, and 4.

In operation, the processor 142 receives an identification (ID) for the mobile platform and a user input driving mode, and references memory 144 to select a unique sound profile matched with the ID and driving mode. The ID may be provided by the control system 130 and received via interface 146 or the ID may be generated with processor 142 execution of instructions stored in instructions and applications 152.

It will be appreciated that the control system 130 may differ from the embodiment depicted in FIG. 1. As a first example, in various embodiments, any combination of the user input device 112, the display device 114, the audio system 116, and the navigation system 132 can be part of an existing console or user interface associated with the vehicle 100, and may be integrated to accept user input (for example, as manipulated buttons, speech, or touch screen interaction). Regardless of the state of integration of these systems, a user may control one or more features of the systems onboard the vehicle 100 by providing user input via at least the user input device 112.

The control module 140 may be implemented in any combination of software or firmware, and may employ program code segments or instructions that perform the various tasks described herein. In various embodiments, the control module 140 may be coupled to or may otherwise utilize one or more remote computer systems and/or external (to vehicle 100) control systems. In operation, the control module receives an ID for the vehicle 100, and, using the ID, references the computer readable storage medium using the id, and locates a unique sound profile for the ID. The control module 140 also receives sail status data for the engine. As mentioned, sail status data for the engine comprises one or more of the set including a sail flag, an entering sail flag, and a stop flag Referring now to FIG. 2 and with continued reference to FIG. 1, a flow chart is provided for a method 200 for a control module 140, in accordance with various exemplary embodiments. Method 200 represents various embodiments of a method associated with the control module 140. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and at 202 the predetermined configurable variables are initialized. As mentioned above, predetermined variables include sail speed, stop speed, amount of time before sail is entered, and the like. Variable initialization may include retrieving the configurable variables from one computer readable storage medium and storing it in another, receiving them via transceiver 136, or receiving the variables via user interaction with the user input device 112. At 204, the sound profiles (such as those described in connection with Table 1 and Table 2) are initialized by arranging, in the memory 144, the sound profiles including the sub-sound profiles, with their respective IDs. In various embodiments, initializing the sound profile further includes initializing rules for the processor to command the audio system to generate sounds, such as, when the audio system is behaving as linked to the pseudo tachometer. Additionally, initializing the sound profile may include determining a manner in which any pre-recorded and generated sounds shall blend together over time, as well as determining how processor generated commands for the tactile system 118 shall be coordinated with the emitted sounds.

As with the configurable variables, the sound profiles may be initialized by retrieving the sound profiles from one computer readable storage medium (for example, the disk 158) and storing it in another (for example memory 144), receiving them via transceiver 136, or receiving the variables via user interaction with the user input device 112. At 206, an ID is received from the powertrain 108. In an alternative, the ID may be determined by the control system 130, based on sensed data, or may be received, via transceiver 136, from a vehicle management system that is external to the control system 130. As described above, the ID includes information about the powertrain 108 (including engine 110), as well as a model type that may be associated with the frame (i.e., the body 102 and chassis 104). 202, 204, and 206 may be performed in a factory, prior to reaching a user, or may be performed as a software install, or may be manually performed by a user.

At 207 a user selected driving mode is received. The user selected driving mode may be received from user input device 112. The method 200 processes the ID and the user selected driving mode to select a sound profile from among a plurality of sound profiles at 208. As mentioned above, processing the ID and driving mode includes the processor 142 referencing a lookup table (such as Table 1, above) that is stored in the memory 144, and searching that lookup table for the received ID and mode. When the received ID/mode is found in the lookup table, the sound profile that matches is the selected sound profile. At 210, the processor 142 in the control module 140 receives sail status data. As mentioned above, the sail status data comprises one or more asserted flags that communicate when and whether the vehicle 100 is in sail (coasting). At 211, sail status and engine status input from the powertrain 108 or the sensor system 134 is processed to dynamically determine a relevant sound profile and sub-sound profile.

At 212, the engine status data and selected sub-sound profile are further processed by the processor 142 to determine prerecorded sounds to emit, sounds to generate, and sound blending required. For example, with reference to Table 1, if the ID is 11 sport (row 2), and the sail status data is sail flag asserted, sub-sound profile (bs) of the sound profile is utilized, and the processor 142 generates commands for an audio system 116 to emit or cease emitting sounds (bs) in accordance with the sail status data and the sound profile associated with 11 sport. At 214, the process may generate commands for a tactile system 118 to cause or cease vibrations in accordance with the sail status data and the sound profile. Continuing with the example above, at 214, the processor 142 generates commands for the tactile system 118 in accordance with sub-sound profile (bs). At 216 the processor 142 commands the audio system 116 and the tactile system 118 in accordance to the commands generated at 212 and 214. Depending upon the application and previously received sail status, after completion of 216 the process may return to 210 for continued processing of sail status data, or end.

Thus, a system and method capable of dynamic sound enhancement for a vehicle is provided. The provided system and method may take the form of control module 140 integrated within a preexisting mobile platform or vehicle management control system 130.

It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 156 and containing computer instructions stored therein for causing a computer processor (such as the processor 142) to perform and execute the program 156. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope as set forth in the appended claims.

What is claimed is:

1. A system for a mobile platform, the system comprising:
    a memory comprising a plurality of sound profiles, and each sound profile of the plurality of sound profiles includes sounds for sail and stop; and
    a processor communicatively coupled to the memory, the processor configured to:
        receive an identification (ID) for the mobile platform;
        receive a driving mode;
        reference the memory using the ID and driving mode to select a sound profile;
        receive sail status data comprising a sail flag and a stop flag, and engine status data for the engine; and
        generate, responsive to processing the sail status data, the engine status data, and the selected sound profile, commands for an audio system coupled to the mobile platform; and
        command the audio system to:
            emit the sail sound when the sail flag is asserted; and
            cease emission of the sail sound when the sail flag is deasserted;
            emit the stop sounds when the stop flag is asserted; and
            cease emission of the stop sounds when the stop flag is deasserted.

2. The control module of claim 1, wherein the sail status data for the engine further comprises an entering sail flag.

3. The control module of claim 2, wherein each sound profile of the plurality of sound profiles further comprises a sound for entering sail.

4. The control module of claim 3, wherein the processor is further configured to command the audio system to:
    emit the entering sail sounds when the entering sail flag is asserted; and
    cease emission of the entering sail sounds when the entering sail flag is deasserted.

5. The control module of claim 4, wherein the processor is further configured to:
    generate, responsive to processing the sail status data, engine status data, and the sound profile,
        commands for a first audio device of the audio system, the first audio device being located internal to a cabin of the mobile platform, or
        commands for a second audio device of the audio system, the second audio device being located external to the cabin of the mobile platform.

6. The control module of claim 4, wherein the processor is further configured to generate, responsive to processing the sail status data, engine status data, and the sound profile, commands for a tactile transducer coupled to the mobile platform.

7. A computer implemented method for a mobile platform, the method comprising:
    receiving, by a processor, a driving mode;
    selecting a unique sound profile from a memory based on processing the driving mode with an identification (ID) for the mobile platform, wherein the unique sound profile comprises sounds for (i) sail, (ii) entering sail, and (iii) stop;
    receiving sail status data for the engine, the sail status data comprising an entering sail flag, a sail flag, and a stop flag; and
    generating, based on the sail status data and the unique sound profile, commands for an audio system that is mechanically coupled to the mobile platform; and
    commanding the audio system to:
        emit the entering sail sounds when the entering sail flag is asserted;
        cease emission of the entering sail sounds when the entering sail flag is deasserted;
        emit the sail sound when the sail flag is asserted;
        cease emission of the sail sound when the sail flag is deasserted;
        emit the stop sounds when the stop flag is asserted; and
        cease emission of the stop sounds when the stop flag is deasserted.

8. The method of claim 7, wherein the audio device is located internal to a cabin of the mobile platform, and further comprising generating, responsive to processing the sail status data and the unique sound profile, commands for the audio device located internal to the cabin of the mobile platform.

9. The method of claim 7, wherein the audio device is located internal to a cabin of the mobile platform, and further comprising generating, responsive to processing the sail status data and the unique sound profile, commands for the audio device located external to the cabin of the mobile platform.

10. The method of claim 7, further comprising generating, responsive to processing the sail status data and the unique sound profile, commands for a tactile transducer coupled to the mobile platform.

11. A system for a mobile platform, the system comprising:
    an audio device configured to be mechanically coupled to the mobile platform;
    a memory comprising a plurality of sound profiles, each sound profile of the plurality of sound profiles comprising prerecorded sounds and rules to generate sounds; and a processor communicatively coupled to the audio device and the memory, the processor configured to:
receive a driving mode and an ID for the mobile platform;
reference the memory using the driving mode and ID to select a sound profile for the id;
receive engine status data and sail status data for the engine, the sail status data comprising a sail flag, an entering sail flag, and a stop flag; and
generate, responsive to processing the engine status data, the sail status data and the selected sound profile, commands for the audio device to:
emit entering sail sounds when the entering sail flag is asserted;
cease emission of the entering sail sounds when the entering sail flag is deasserted;
emit sail sounds when the sail flag is asserted;
cease emission of the sail sounds when the sail flag is deasserted;
emit stop sounds when the stop flag is asserted; and
cease emission of the stop sounds when the stop flag is deasserted.

12. The method of claim 11, wherein the received ID for the mobile platform comprises an engine type and a mobile platform model.

\* \* \* \* \*